UNITED STATES PATENT OFFICE.

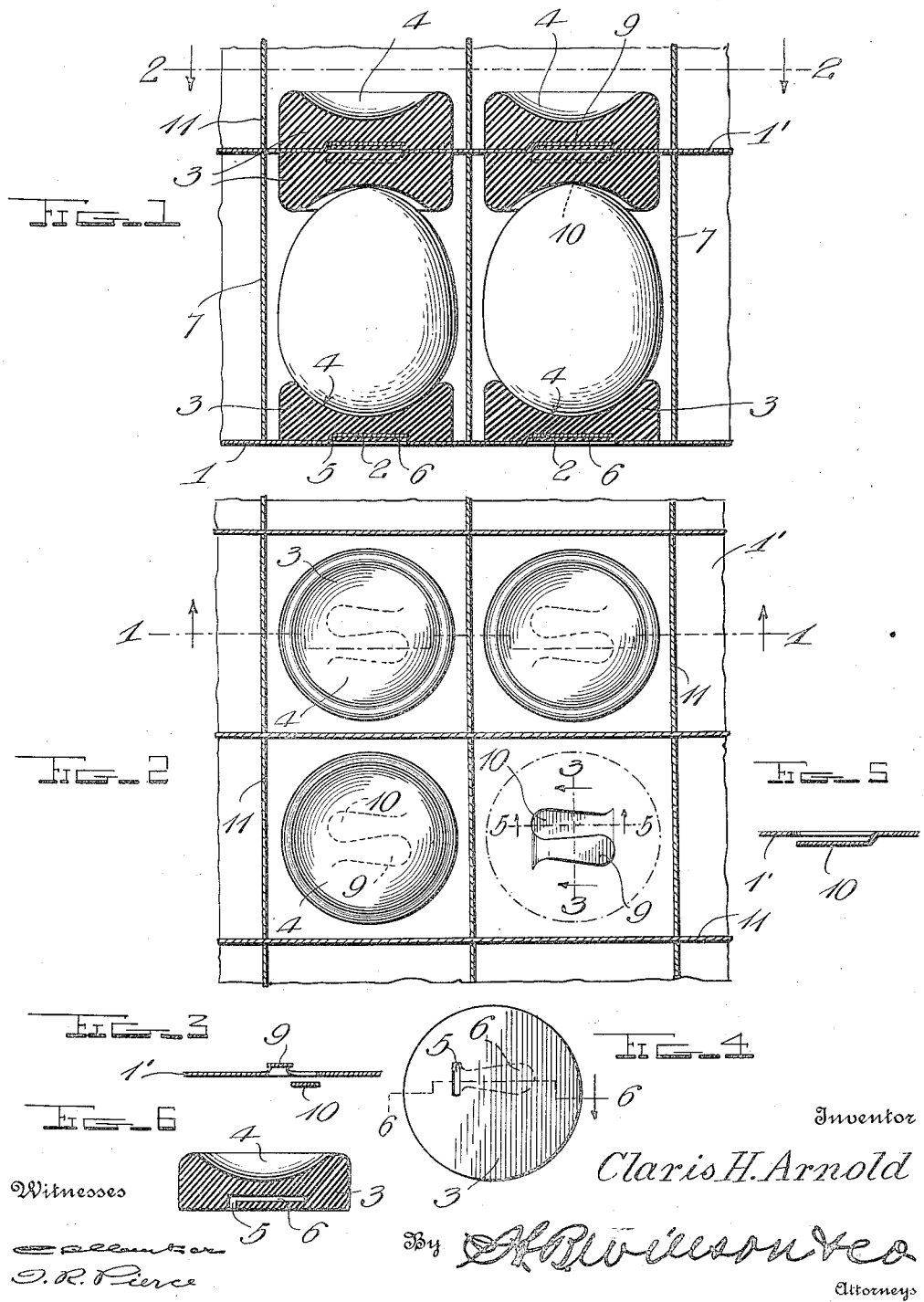

CLARIS HENRY ARNOLD, OF EATON RAPIDS, MICHIGAN.

EGG-CRATE.

1,115,270.

Specification of Letters Patent.

Patented Oct. 27, 1914.

Application filed November 26, 1913. Serial No. 803,162.

*To all whom it may concern:*

Be it known that I, CLARIS HENRY ARNOLD, a citizen of the United States, residing at Eaton Rapids, in the county of Eaton and State of Michigan, have invented certain new and useful Improvements in Egg-Crates; and I do declare the following to be a full, clear, and exact description of the invention, such as will enable others skilled in the art to which it appertains to make and use the same.

This invention relates to improvements in egg cases for packing eggs for transportation.

The primary object of the same is to effectively provide against the breakage of the eggs *in transitu*, as well as when depositing or placing them in the casing.

A further object is to provide for handling the egg containing cases expeditiously and with facility and less liability of breakage, by the provision of cushioned egg retainers.

A still further object is to provide a means for quickly attaching and detaching said retainers.

With these and other objects in view, the invention consists of certain novel features of construction and the combination and arrangement of parts as will be more fully described and claimed.

In the accompanying drawings: Figure 1 is a longitudinal vertical section taken on the line 1—1 of Fig. 2. Fig. 2 is a horizontal section taken on the line 2—2 of Fig. 1, one of the egg holders being removed to illustrate my improved fastening means; Fig. 3 is a transverse vertical section of one of the attaching members taken on the line 3—3 of Fig. 2. Fig. 4 is a plan view of the bottom of one of the egg holders, illustrating the position of the opening therein; Fig. 5 is a longitudinal vertical section of one of the attaching members taken on the line 5—5 of Fig. 2, and Fig. 6 is a transverse longitudinal vertical section taken on the line 6—6 of Fig. 4.

In the present embodiment of my invention, I preferably employ a plate 1, which for the sake of convenience, will be designated as a bottom plate. This plate 1 may be constructed of any metallic material, such as tin, steel, etc. Initially, it is cut, so as to substantially conform to the shape of the receptacle (not shown) and when in use it is situated on the flooring thereof. From the plate 1, at suitable intervals, as practical use may suggest, are cut a plurality of strips about an inch long, having the outer portion thereof enlarged, such as is clearly shown in Fig. 1. These strips are then obliquely and horizontally extended to form the attaching clips or tongues 2. To the tongues thus formed are attached the bottom series of circular egg retainers 3, which have their upper surface concaved or depressed, as at 4, to provide a cavity adapted to conform to and receive the eggs endwise. Ordinarily, the retainers 3 are composed of a resilient substance, such as rubber, but of course it will be understood that I do not limit myself to this composition, nor to the circular conformation of the retainers as stated.

For conveniently removing and securing the retainers 3 to the clips or tongues 2, the former are provided with an opening 5, which extends vertically inward from the bottom of said retainers to the interior thereof and communicates with the horizontally disposed cavity 6, as shown in Fig. 6. Therefore, when it is desired to secure the retainers 3 to the bottom plate 1, said tongues or clips 2 are slipped into the passages 5 and 6, and as the walls of said passages are elastic, they will be enlarged by the outer portion of said tongues 2, and the contacting effect resulting from said enlargement will cause the reduced portions thereof to be firmly gripped, which will rigidly secure said retainers 3 to clips 2. After the bottom series of retainers have each been attached to their respective clips, a card board filler 7 of standard construction is then placed within the casing (not shown) each cell of the filler embracing one of the retainers 3. The various cells of said filler 7 are then filled, the eggs being vertically disposed therein with one end located within the cavities 4 as shown in Fig. 1. A second plate 1' is disposed on the upper edges of filler 7 effectively closing the ends thereof and thereby forming a separate compartment for each egg. This second plate 1' is identical to the bottom plate 1, with the exception that instead of having only one series of tongues, or clips, it is provided with two, 9 and 10, formed by the S-shaped cuts in the plate 1' one of said tongues being bent upwardly and then horizontally above the plate 1' and the other 10, extending downwardly and below the plate 1', but in an opposite direction to that of the tongue 9, so that the horizontal portion of the clip 10 is disposed below and to one side of the clip 9. By forming the clips of the second plate in this manner, when the retainers 3 have been secured to each series, they will be disposed back to back, those on clip 10 projecting in an inverted position within the cells formed by filler 7, and engaging the upper ends of the eggs therein and those on clips 9 being situated so as to be inclosed by the next filler 11, which, coacting with said second plate form another series of cells, into which the eggs are placed and in which they are supported in a manner similar to the preceding cells.

In the packing operation, a bottom plate is disposed on the flooring of the casing, the retainers are then secured thereto, fillers are next introduced into the casing, each cell thereof embracing one of the retainers, eggs are then placed endwise within said cells, with their ends resting in the concaved portion of said retainers, a second plate carrying oppositely disposed retaining members is then placed upon the upper edges of said filler, the inverted retainers entering the filler cells and engaging the free ends of the eggs therein, while the retainers disposed in an upright position act as supports for the succeeding series of eggs. The same procedure being continued until the casing is filled.

I claim as my invention:

1. A device of the character described comprising a supporting member, offset tongues carried thereby, and a plurality of resilient egg retainers, each of the latter having therein an L-shaped passage to receive one of said tongues whereby said retainers have a detachable engagement therewith.

2. A device of the character described comprising a supporting member, offset tongues carried thereby, said tongues having contracted inner portions, and a plurality of egg retainers of resilient material each having therein an L-shaped passage to receive one of said tongues whereby the retainers have a detachable engagement with said tongues.

3. A device of the character described comprising a metal supporting plate, a series of tongues struck out of said plate and extended vertically and horizontally therefrom and a plurality of egg retainers, each of the latter having therein a passage extending vertically inward from their base and communicating with a horizontally disposed passage, whereby to receive one of said tongues and detachably connect the retainers to said support.

4. A device of the character described comprising a metal plate formed at intervals with substantially S-shaped slits to form pairs of oppositely projecting tongues, the tongues of each pair being offset in opposite directions from said plate and a plurality of resilient egg retainers disposed opposite each other on opposite sides of the plate each having therein an L-shaped passage of less width than said tongues, whereby when one of the latter is engaged therewith the passage will be expanded and the retainer bindingly secured thereto.

In testimony whereof I have hereunto set my hand in presence of two subscribing witnesses.

CLARIS HENRY ARNOLD.

Witnesses:
MARY L. DANN,
CHARLES LENTZ.